March 18, 1930.  C. F. FAULHABER  1,751,313
ELECTRIC ANIMAL POKE
Filed April 15, 1929
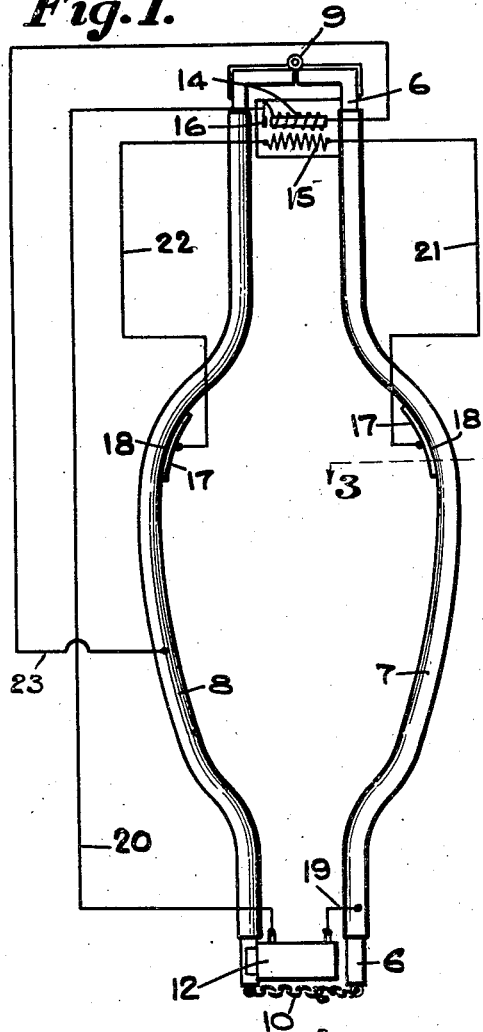
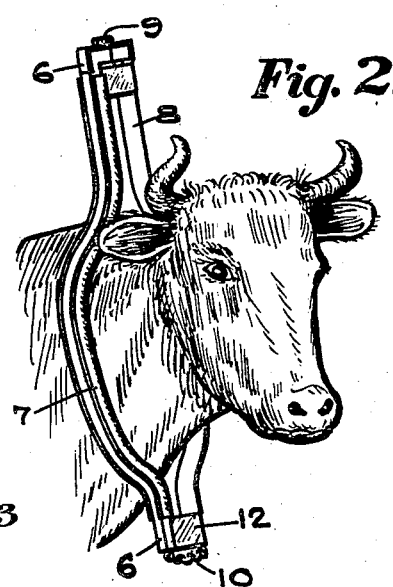
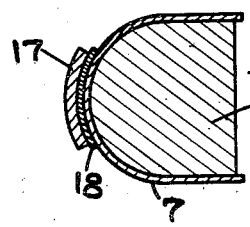
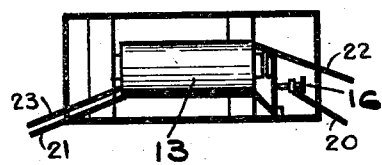
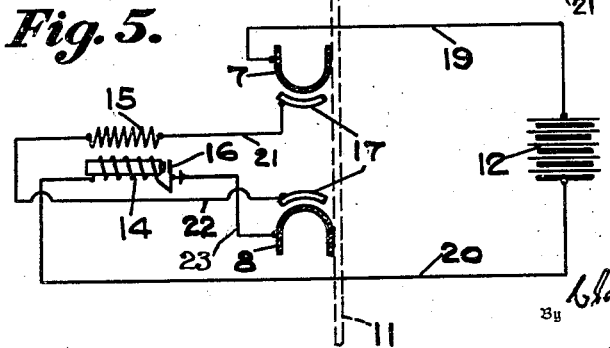
Inventor
Clarence F. Faulhaber
By Hiram A. Sturges
Attorney Patented Mar. 18, 1930

1,751,313

UNITED STATES PATENT OFFICE

CLARENCE F. FAULHABER, OF MIDDLEBRANCH, NEBRASKA

ELECTRIC ANIMAL POKE

Application filed April 15, 1929. Serial No. 355,181.

This invention relates to an animal poke for use in preventing live stock from breaking down or moving through wire fences. It is well known that cattle, attracted by growing crops in adjacent fields often force a passage through fences, and since these fences are generally constructed by use of lines of wire stretched between posts set at intervals, the electrical poke to be described herein operates to great advantage, the wire of the fence when engaged by the poke, causing the completion of an electrical circuit and resulting shock to the animal, this shock, while not causing physical injury, being sufficient to cause pain and tending to prevent any further attempt on the part of the animal to move through or to interfere with a fence.

The invention includes an animal poke consisting of few and simple parts which may be manufactured at a limited cost, will be convenient and durable in use and will be effective for the purposes mentioned.

With the foregoing objects and others in view the invention presents a new and useful construction, combination and arrangement of parts as described herein and claimed, and as illustrated in the accompanying drawing, it being understood that changes may be made in form, size, proportion of parts and minor details, said changes being within the scope of the invention as claimed.

In the drawing, Fig. 1 is a plan view of an electrical animal poke embodying my invention, the induction coil and electrical conductors being diagrammatic to clearly explain operation. Fig. 2 is a perspective view showing the device applied and ready for operation. Fig. 3 is an enlarged section on line 3—3 of Fig. 1. Fig. 4 is a diagram showing electrical connections.

Referring now to the drawing for a more particular description, the invention consists, in part, of a pair of arms 6 having suitable curvatures between their ends so that, when connected at their ends a yoke or poke will be provided which will fit the neck of the animal without undue chafing, said arms being extended a suitable distance above and below the curved portions as shown in Fig. 1 of the drawing, to provide barriers or obstructing parts which engage the wires or one of the wires if the head of the animal projects through the fence between the wires.

These arms may be constructed of wood or other fibrous material. Numerals 7 and 8 indicate a pair of metallic linings or casings which are secured by any suitable means to the arms. These casings may be constructed of thin sheet metal and are disposed at the front and inner sides of the arms and are depended upon for operation since they operate as electrical conductors. It will be noted that these casings do not cover the end-portions of the arms 6 and therefore said casings are electrically insulated relative to each other. Numeral 9 indicates a hinge which connects the upper ends of arms 6 and the lower ends of said arms may be connected by a strap 10 and buckle.

As thus described, a yoke or poke is provided consisting of parts which may extend below and above the neck so that these extensions will encounter the wires of a fence if the animal attempts to pass therethrough, the metallic strips 7 and 8 being so disposed on the arms that they may engage said wires. Numeral 11 (Fig. 5) indicates, by broken lines, one of the wires of a fence.

Any suitable arrangement of parts may be made for causing an electrical shock to the animal upon completion of an electrical circuit, the wire 11 operating as a switch for closing the circuit. For this purpose I have shown an electric battery 12 which is secured to one of the arms 7 or 8 at the lower end of the poke, and also have shown an induction coil 13 (Fig. 4), the primary and secondary coils thereof, for convenience of description, being respectively indicated at 14 and 15, a buzzer or vibrator being indicated at 16. The electric battery and induction coil as well as electrical conductors to be described are, of course, suitably housed from the weather and carried by the poke. Numerals 17 indicate a pair of metallic plates each being mounted by any suitable means upon a metallic casing at the inner side thereof. These members 17 may consist of thin metallic strips so that they will not cause chafing of the skin and preferably they are disposed near the upper part of the curved portions of the poke as best shown in Fig. 1 of the drawing, so that they will engage the skin of the animal. Numerals 18 indicate insulating-strips which are disposed between the plates 17 and metallic casings 7 and 8.

Numeral 19 indicates an electrical conductor leading from one pole of the battery 12 to the metallic casing 7, and an electrical conductor 20 leads from the opposite pole of the battery 12 to the primary coil 14. Numeral 21 indicates an electrical conductor in communcation with the secondary coil 15 and which communicates with the metallic strip 17 of casing 7, and at 22 is indicated an electrical conductor which is in communication with the metallic plate 17 of the casing 8 and in communication with the secondary coil 15. A conductor 23 leads from the primary coil 14 to the casing 8.

One advantage in the use of the vibrator 16 is that it will cause a succession of shocks which will continue until the animal backs away from the fence to discontinue a contact of the casings 7 and 8 with a fence wire 11.

It will be seen that the electric battery will not be called into use except when an electrical circuit has been established by an electrical communication of the metallic casings, one with the other, and therefore changing or recharging of the electric battery will not be required except at long intervals of time.

I claim as my invention,—

1. In a device for the purpose described, a pair of connected arms electrically insulated from each other and having a form permitting them to encircle and project above and below the neck of an animal, metallic casings on said arms, metallic contact-elements adapted to engage the neck of the animal, said elements being carried by and electrically insulated from the metallic casings, and a normally open energized electrical circuit carried by said connected arms, said circuit including the casings and contact elements and adapted to be closed by establishing an electrical communication, one with the other, of said metallic casings.

2. In a device for the purpose described, a pair of connected arms electrically insulated from each other and adapted to encircle and project outwardly from the neck of the animal, metallic casings on said arms, metallic contact-elements adapted to engage the neck of the animal and mounted on the metallic casings, means for electrically insulating the metallic contact-elements from the metallic casings, an induction coil, an electric battery, a normally open electrical circuit including the electric battery, the induction coil, said electrical contact elements and metallic casings and adapted to be closed by establishing an electrical communication, one with the other, of said metallic casings.

3. In a device for the purpose described, a pair of removably connected arms electrically insulated from each other arranged to encircle the neck of an animal and having outwardly projecting end-portions, an induction coil including a vibrator carried by said removably connected arms, an electric battery carried by said arms, a pair of metallic casings on said arms, a pair of insulated electrical contact-elements on said casings, and a normally open electrical circuit including the electric battery, the induction coil, the vibrator, the electrical contact-elements of said pair and metallic casings said circuit being adapted to be closed by establishing an electrical communication of one metallic casing with the other metallic casing of said pair.

4. In a device for the purpose described, a yoke having its arms electrically insulated from each other and adapted to be connected, metallic casings on said arms, electrical contact-elements upon and electrically insulated from said casings, and a normally open energized electrical circuit including the electrical contact-elements and casings, said circuit being arranged to be closed by establishing an electrical communication, one with the other, of said metallic casings.

5. In a device for the purpose described, a yoke of electrical insulating material having hingeably connected arms, a pair of metallic casings on said arms, electrical contact-elements carried by and electrically insulated from the casings, and a normally open energized electrical circuit including the casings and electrical contact-elements, said electrical circuit being arranged to be closed by establishing an electrical communication between the metallic casings of said pair.

In testimony whereof, I have affixed my signature.

CLARENCE F. FAULHABER.